(12) United States Patent
Vdolek

(10) Patent No.: US 8,285,292 B1
(45) Date of Patent: Oct. 9, 2012

(54) DETECTION OF CROSS-CONNECTION BETWEEN A WIRELESS LOOP NETWORK AND ANOTHER LOOP NETWORK AT A SUBSCRIBER'S PREMISES

(75) Inventor: Alex D. Vdolek, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1415 days.

(21) Appl. No.: 09/502,655

(22) Filed: Feb. 11, 2000

(51) Int. Cl.
*H04W 40/00* (2009.01)

(52) U.S. Cl. ......... 455/445; 709/250; 379/412; 370/328

(58) Field of Classification Search ............... 370/201, 370/242, 241, 243, 244, 245, 247, 248, 352, 370/353, 354, 356, 401; 379/14.01, 22.03, 379/22.06, 22.07, 22.08, 23
See application file for complete search history.

(56) References Cited

U.S. PATENT DOCUMENTS

| | | | | |
|---|---|---|---|---|
| 4,995,074 A * | 2/1991 | Goldman et al. | ........ | 379/93.35 |
| 5,610,910 A * | 3/1997 | Focsaneanu et al. | ........ | 370/351 |
| 5,694,430 A | 12/1997 | Critchlow et al. | ........ | 375/295 |
| 5,699,414 A * | 12/1997 | Telibasa | ........ | 379/88.13 |
| 5,734,678 A | 3/1998 | Paneth et al. | ........ | 375/240 |
| 5,751,789 A * | 5/1998 | Farris et al. | ........ | 379/32.04 |
| 5,841,840 A * | 11/1998 | Smith et al. | ........ | 379/93.01 |
| 5,867,510 A | 2/1999 | Steele | ........ | 371/37.7 |
| 5,954,799 A * | 9/1999 | Goheen et al. | ........ | 709/250 |
| 5,956,386 A | 9/1999 | Miller | ........ | 379/27 |
| 5,966,373 A | 10/1999 | Stephenson et al. | ........ | 370/335 |
| 5,991,292 A * | 11/1999 | Focsaneanu et al. | ........ | 370/352 |
| 5,995,839 A * | 11/1999 | Coursey et al. | ........ | 455/445 |
| 6,011,784 A * | 1/2000 | Brown et al. | ........ | 370/329 |
| 6,081,587 A * | 6/2000 | Reyes et al. | ........ | 379/93.34 |
| 6,128,510 A * | 10/2000 | Beukema et al. | ........ | 455/557 |
| 6,147,786 A * | 11/2000 | Pan | ........ | 398/1 |
| 6,188,764 B1 * | 2/2001 | Huang et al. | ........ | 379/412 |
| 6,256,518 B1 * | 7/2001 | Buhrmann | ........ | 455/572 |
| 6,259,775 B1 * | 7/2001 | Alpert et al. | ........ | 379/93.05 |
| 6,345,088 B1 * | 2/2002 | Gu et al. | ........ | 379/93.35 |
| 6,362,908 B1 * | 3/2002 | Kimbrough et al. | ........ | 398/164 |
| 6,438,384 B1 * | 8/2002 | Chen | ........ | 455/462 |
| 6,526,581 B1 * | 2/2003 | Edson | ........ | 725/74 |
| 6,757,377 B1 * | 6/2004 | Bingel et al. | ........ | 379/373.01 |
| 6,912,276 B1 * | 6/2005 | Olafsson et al. | ........ | 379/93.35 |
| 2003/0101459 A1 * | 5/2003 | Edson | ........ | 725/82 |

* cited by examiner

*Primary Examiner* — Salman Ahmed

(74) *Attorney, Agent, or Firm* — Zagorin O'Brien Graham LLP

(57) ABSTRACT

The invention relates to a remote unit for use in conjunction with a communications network. The remote unit includes a network interface which provides an interface between a premises communication system and a first network. The interface permits the premises communication system to receive at least one service over the first network. The remote unit also includes a detector for detecting a cross-connection to a second network which is also connected to the premises communication system.

30 Claims, 5 Drawing Sheets

DETECTION OF CROSS-CONNECTION BETWEEN A WIRELESS LOOP NETWORK AND ANOTHER LOOP NETWORK AT A SUBSCRIBER'S PREMISES

BACKGROUND

1. Field of the Invention

The invention relates generally to fixed wireless loop networks. In particular, the invention relates to detection of a condition in which a fixed wireless loop device is connected to service a subscriber location in parallel with another, non-compatible service device.

2. Background of the Invention

A "subscriber loop" signifies the connection between a telephone central office and a "premises communication system." In this latter regard, a "premises communication system" is a set of telecommunication equipment maintained by a subscriber on premises such as a house or an office. The subscriber "subscribes" to services provided on, through, or over a network of which the telephone central office is an element.

Increasingly, the fixed landline equipment that embodies a subscriber loop is being replaced by wireless equipment. For example, local exchange carrier (LEC) wiring to a subscriber's house may be replaced by fixed wireless loop equipment that eliminates telephone wires, telephone poles, junctions, and other such LEC infrastructure.

Fixed wireless loop networks typically include one or more base stations and a plurality of remote units. A subscriber typically connects a remote unit to a premises communication system and populates the premises communication system with premises communication equipment such as telephones. A service provider provides services to the subscriber premises equipment over a wireless communications link between the remote unit and one of the base stations.

Installation of a remote unit at a subscriber's premises requires that the remote unit be patched into the subscriber's premises communication system. This process can result in multiple service providers being connected to the same premises communication system. For instance, this situation can result when a local exchange carrier is providing service to a subscriber over LEC telephone lines and a remote unit is then patched into the subscriber's telephone system without disconnecting the local exchange carrier. When two service providers are competing for use of the same premises communication system, it is likely that neither of the services will be able to function. This would deny a home subscriber, for example, access to normal telephone service and the ability to dial 911. As a result, there is a need for a method, network and network components which detect a condition in which different service equipment are coupled to the same communication system.

SUMMARY OF THE INVENTION

The invention relates to a remote unit for use in a conjunction with a communications network. The remote unit includes a network interface which provides an interface between a premises communication system and a first network. The interface permits the premises communication system to receive at least one service over the first network. The remote unit also includes a detector for detecting a cross-connection to a second network which is also connected to the premises communication system.

The invention also relates to a fixed loop wireless network. The network includes a base station providing services to a premises communication system. A remote unit provides an interface between the base station and the premises communication system. The remote unit includes detection electronics for detecting a cross-connection between the remote unit and another network also connected to the premises communication system.

The invention also relates to a method of operating a network. The method includes providing an interface between a first network and a premises communication system. The interface permits the premises communication system to receive at least one service over the first network. The method also includes detecting a cross-connection to a second network connected to the premises communication system.

DETAILED DESCRIPTION OF THE PREFERRED EMBODIMENT

The invention relates to a remote unit for use in conjunction with a communications network. The remote unit is positioned at a premises to act as an interface between the network and the premises communication system. Hence, the premises communication system is able to receive at least one service over the network. The remote unit also includes a detector for detecting whether a second network is also actively connected to the premises communication system. The condition in which the two (or more) networks are actively connected to the premises communication system is referred to as a "cross-connection". An actively connected network is a network over which a service provider is enabled for providing service to the premises communication system.

When the remote unit does not detect a cross-connection, the remote unit provides the service to the premises communication system. However, when the remote unit detects a cross-connection, the remote unit withholds the service from the premises communication system. Hence, when a cross-connection exists, the premises communication system receives service from the other network without interference from the remote unit. As a result, a remote unit according to the present invention accounts for multiple service providers competing to provide services over a single premises communication system.

Figure 1A:
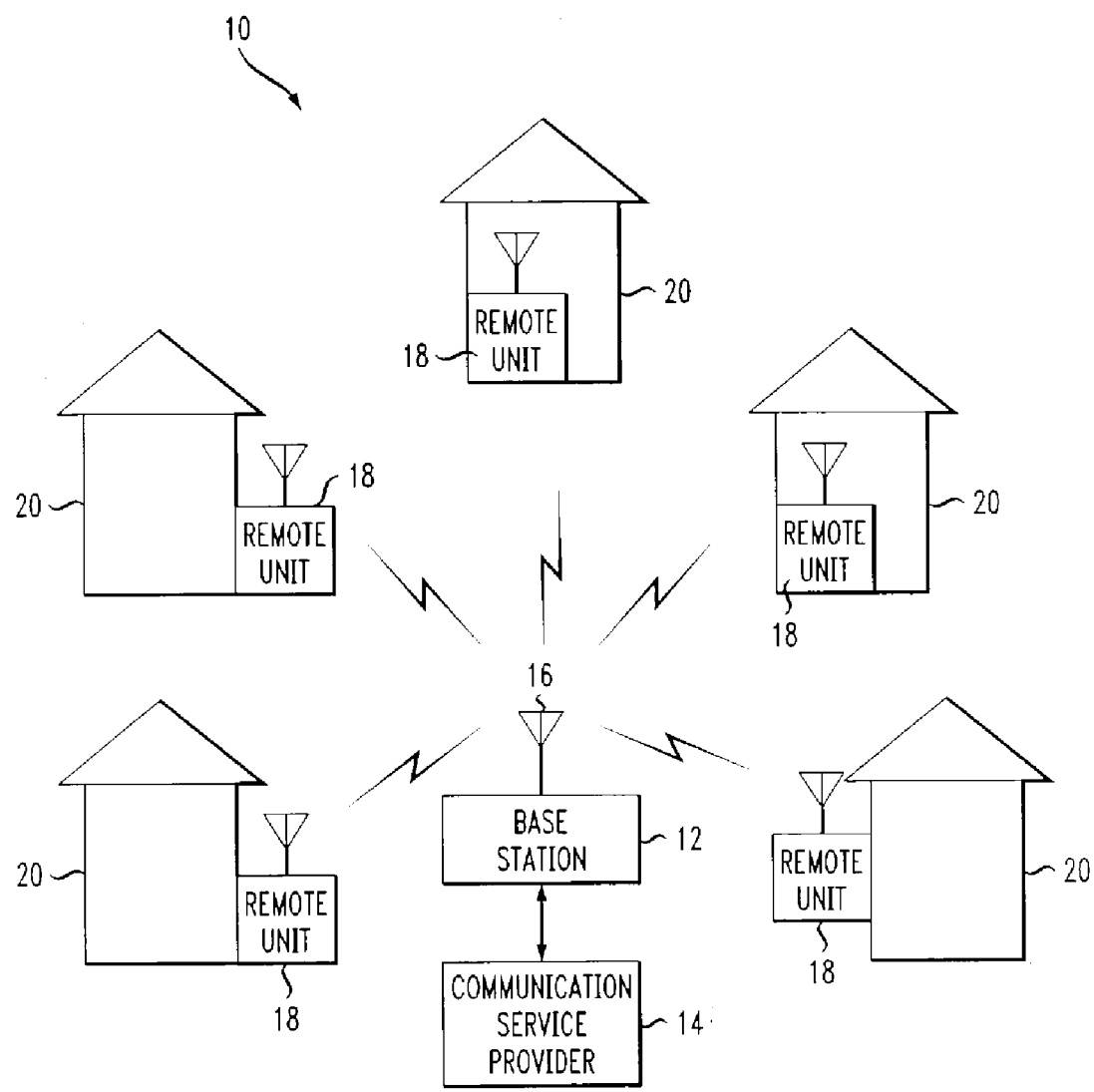
FIG. 1A illustrates a fixed wireless loop network according to this invention.

An example of a network which can employ a remote unit according to the present invention is a fixed wireless loop network. FIG. 1A illustrates a fixed wireless loop network 10 which includes a base station 12 associated with a service provider 14. The service provider 14 can provide services such as telephone communications, network access such as internet access, entertainment services such as television programming, etc. The base station 12 includes a transceiver 16 for transmitting the services to a plurality of remote units 18. Each remote unit 18 is positioned at subscriber premises 20 such as a home, business, building, etc. The remote unit 18 can be positioned within the premises 20, outside the premises 20 or can be attached to a wall of the premises 20.

Figure 1B:
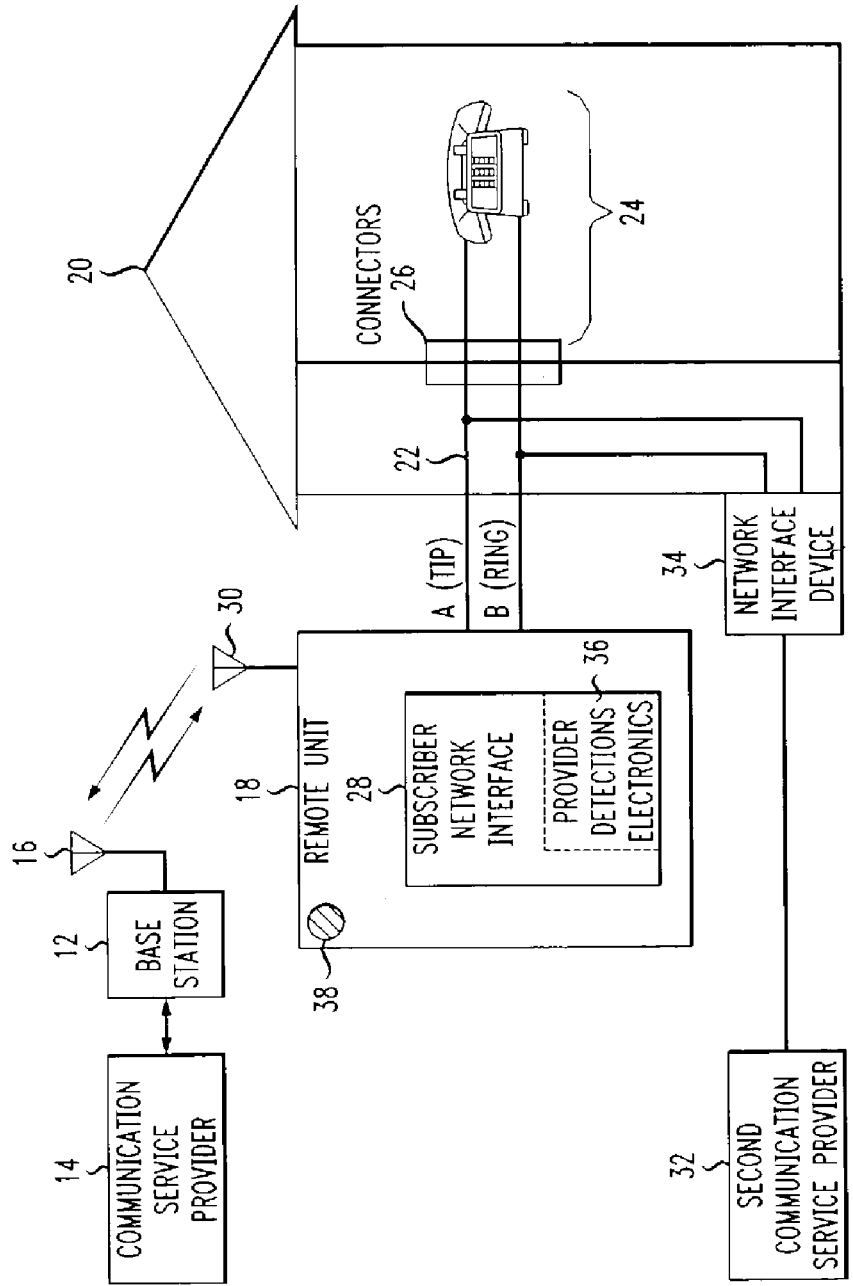
FIG. 1B illustrates a base station in communication with a premises communication system.

FIG. 1B illustrates a single link in the fixed wireless loop network 10. A remote unit 18 is positioned at subscriber premises 20 and is in communication with the premises communication system 22. The premises communication system 22 typically includes the wires which run through the walls of the premises 20 but can include other wired and wireless links which permit communication between the remote unit 18 and premises equipment 24 such as a telephone. The premises communication system 22 can include connectors 26 and adapters such as telephone jacks, coaxial cable jacks and other connectors 26 which facilitate communication between the subscriber premises equipment 24 and the premises communication system 22. The subscriber premises equipment 24 can include telephones, fax machines, televisions, computers, modems, cameras, wires connected to the premises communication system and other items which permit the subscriber to interact with the premises communication system. Loop communication between the subscriber premises equipment 24 and the premises communication system 22 are typically provided by ring and tip lines, although other means of loop communications are possible.

Although a single item of subscriber premises equipment 24 is illustrated in communication with the premises communication system 22, a plurality of different subscriber premises equipment 24 items can be in communication with a single premises communication system 22. For instance, many households have several phones, a fax machine and a modem in communication with a household communication system. Additionally, many premises include more than one premises communication system 22 so a computer and telephone can be used at the same time.

The remote unit 18 includes a subscriber network interface 28 which acts as an interface between the premises communication system 22 and the base station 12. More specifically, the remote unit 18 provides communication between the premises communication system 22 and the base station. The network interface 28 receives signals from the premises communication system 22 and converts these signals into a form suitable for transmission to the base station 12. The network interface 28 includes a transceiver 30 for transmitting the converted signals from the remote unit 18 to the base station 12. The network interface 28 also receives signals from the base station 12 via the transceiver 30. The received signals are converted into signals which are loaded onto the premises communication system 22.

As illustrated in FIG. 1B, another service provider 32, such as a local exchange carrier, can also be in communication with the premises communication system 22 through a Network Interface Device (NID) 34 which is typically attached to an outside wall of the premises. When the other service provider 32 is active on the premises communication system 22, the other service provider 32 can interfere with operation of the remote unit 18 and/or the remote unit 18 can interfere with operation of the other service provider 32. This situation can occur when the remote unit 18 is installed but the other service provider 32 is not inactivated by disconnecting the NID from the premises communication system 22 or by requesting that the other service provider 32 stop providing services. In some cases the first and second service providers can actually be from the same company as can occur when a company switches mechanisms for providing services to subscribers.

The network interface 28 in the remote unit 18 includes a provider detection electronics 36 for detecting a cross-connection to or on the premises communication system 22. For instance, the provider detection electronics 36 can identify the connection of an LEC to the premises communication system 22. When cross-connection is detected, the network interface 28 disables the remote unit 18 so the services can be provided by the other service provider 32 without interference from the remote unit 18.

The remote unit 18 can also include a subscriber notification mechanism 38 which notifies the subscriber of the cross-connection condition. A suitable subscriber notification mechanism 38 includes, but is not limited to, LEDs associated with the condition, a speaker for providing an audible message and a display screen for providing a written message.

Figure 2:
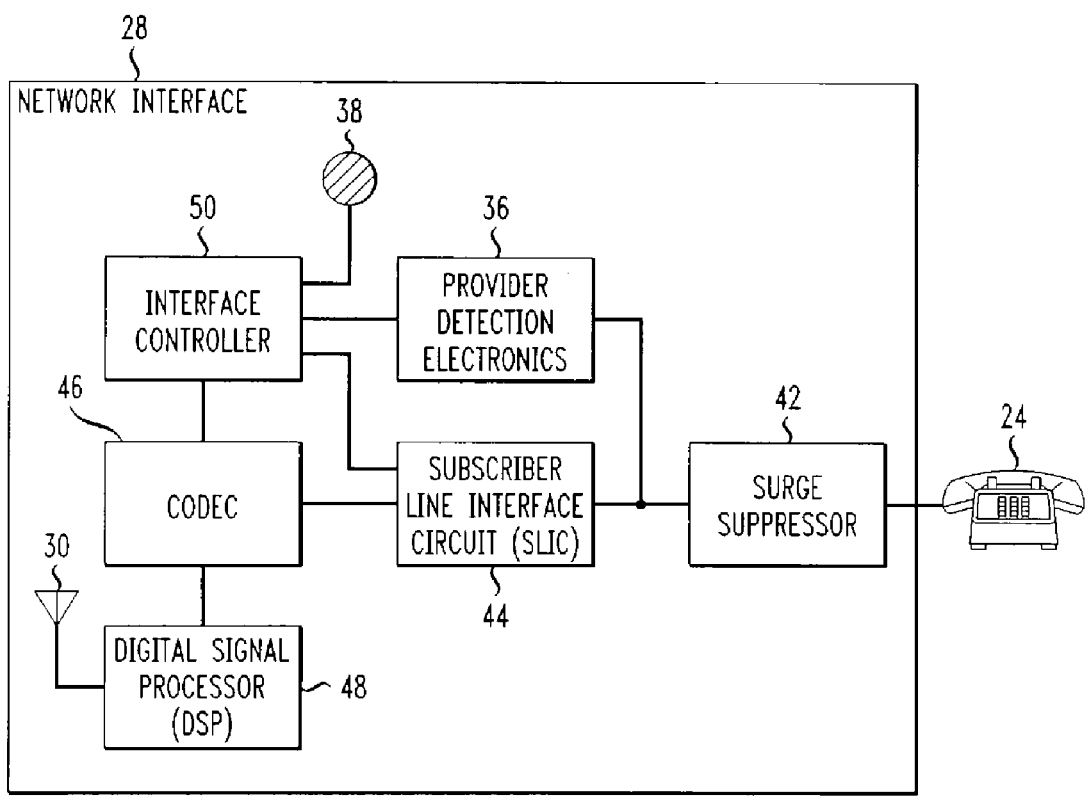
FIG. 2 is a block diagram of a remote unit having detection electronics.

FIG. 2 is a block diagram illustrating the network interface 28. The subscriber premises equipment 24 is connected to a surge suppressor 42 which protects the user interface circuitry from electrical transients such as lightning strikes. Suitable surge suppressors 42 include, but are not limited to, a TCM 1050 manufactured by Texas Instruments Corporation.

The surge suppressor 42 is connected to a subscriber line interface circuit, SLIC 44. The SLIC 44 supplies the premises communication system 22 with current required to operate the subscriber premises equipment 24 such as a telephone. A suitable SLIC 44 includes, but is not limited to, a model HC55181 manufactured by Intersil in Mountaintop, Pa. The surge suppressor 42 is also connected to provider detection electronics 36. As described above, the provider detection electronics 36 detects the cross-connection condition.

The SLIC 44 is connected to a Codec 46 which converts analog signals from the telephone into an 8-bit digital signal. The Codec 46 also converts 8-bit digital signals into analog signals which are provided to the premises communication system 22 where they can be received by the subscriber premises equipment 24. A suitable Codec 46 includes, but is not limited to, a TP 3054B PCM Codec 46 Filter manufactured by Texas Instruments. The Codec 46 is connected to a digital signal processor, DSP 48, which is connected to the transceiver 30. The DSP 48 converts signals from the Codec 46 into a form suitable for transmitting from the transceiver 30 and converts signals from the transceiver 30 to a form which is suitable for receipt by the Codec 46.

An interface controller 50 is connected to and controls operation of both the SLIC 44 and the provider detection electronics 36. A suitable controller 50 includes, but is not limited to, a processor in communication with a memory such as the MPC850 manufactured by Motorola, hardware capable of performing the necessary functions and hardware, processor and memory combinations. The interface controller 50 is connected to the subscriber notification mechanism 38. The interface controller 50 can operate the subscriber notification mechanism 38 to notify the subscriber that another service provider 32 is also active on the premises communication system 22.

Figure 3:
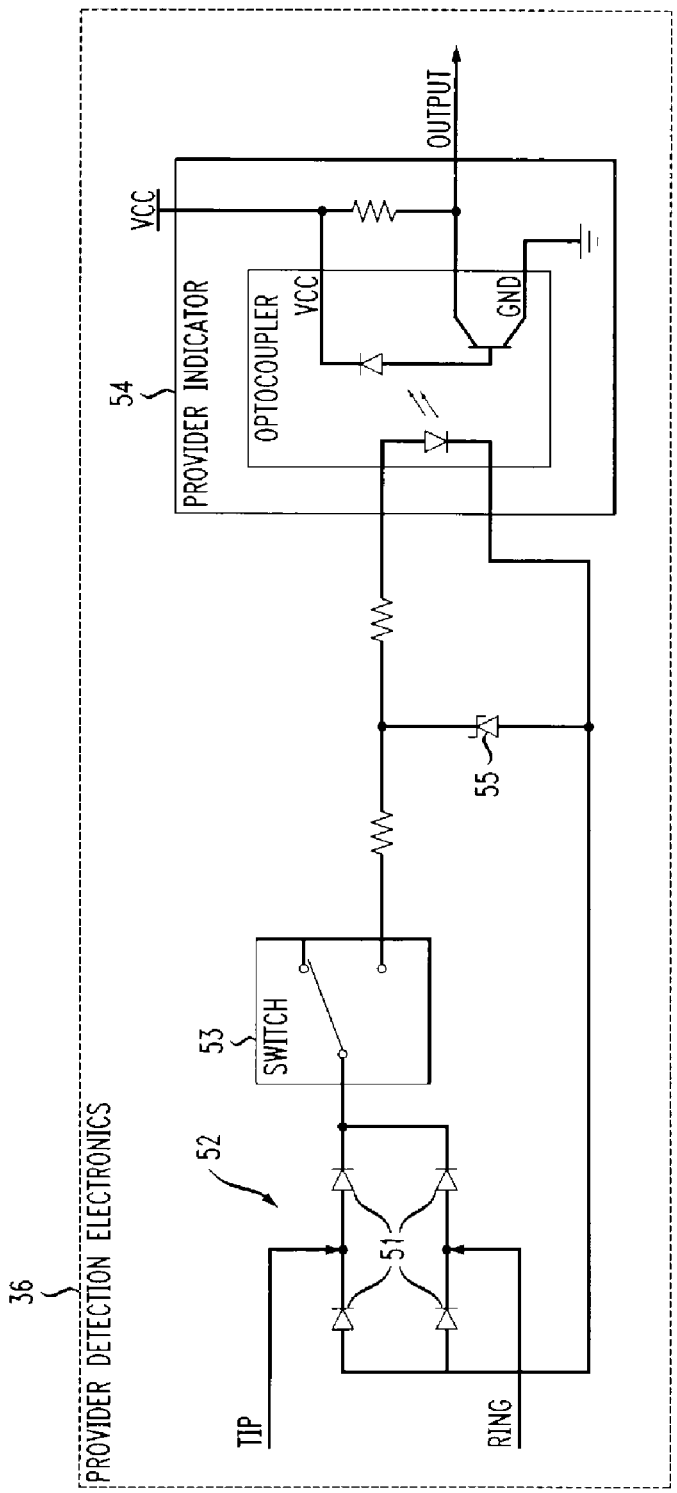
FIG. 3 is a schematic for an embodiment of the detection electronics.

FIG. 3 illustrates provider detection electronics 36 which are suitable for use with the remote unit 18 described above. The provider detection electronics 36 are connected to the tip and ring lines of a premises communication system 22, and are preferably connected in parallel with the SLIC 44. The provider detection electronics 36 includes four diodes 51 arranged in a diode bridge 52. The tip and ring lines are connected with the bridge 52 such that the bridge 52 provides the correct polarity to the circuit regardless of how the premises may be wired. An electronics activation mechanism 53, such as a switch, is connected in series with the bridge 52. The electronics activation mechanism 53 can be connected to the interface controller 50 (shown on FIG. 2) such that the interface controller 50 can activate and de-activate the provider detection electronics 36.

A provider indicator 54 and a fifth diode 55 are connected in parallel and this combination is connected in series with the electronics activation mechanism 53. The provider indicator 54 indicates the presence of a current in the provider detection electronics 36. A suitable provider indicator 54 includes, but is not limited to, an optocoupler. An optocoupler would operate by outputting a logic low when a current is present in the provider detection electronics 36. However, when a current is not present in the provider detection electronics 36, the optocoupler would output a logic high. The fifth diode 55 is present to prevent electrical transients from damaging the provider indicator 54. For instance, when the provider indicator 54 is an optocoupler, the fifth diode 55 can protect an LED in the optocoupler from electrical transients.

During operation of the remote unit 18, the provider detection electronics 36 detect cross-connection with other service providers 32 in or on the premises communication system 22. The test for such cross-connection can be done during a power-up routine of the remote unit 18 and/or each time the subscriber uses the premises communication system 22. For instance, each time the subscriber makes a phone call, the provider detection electronics 36 can be activated. This activation can be repeated for some pre-determined number of times in order to ensure that cross-connection with another service provider 32 is not present. Once the pre-determined number of times has been exceeded without cross-connection being detected, the provider detection electronics 36 can remain inactive until the next time the remote unit 18 is powered up.

Returning to FIG. 2, the interface controller 50 initiates detection of cross-connection with another service provider 32 by placing the SLIC 44 in a power-down mode so the SLIC 44 does not place any current on the tip and ring lines. The interface controller 50 activates the provider detection electronics 36. When the cross-connection condition exists, a current flows through the diode bridge 52 as shown in FIG. 3 and the provider indicator 54 indicates the presence of the current. When there is no cross-connection with another service provider 32, there is no other source of current on the premises communication system 22. As a result, the provider indicator 54 indicates the lack of activity on the premises communication system 22. The interface controller 50 receives the output from the provider indicator 54 and responds to the output based on whether is or not cross-connection is detected.

The provider detection electronics 36 can be incorporated onto the SLIC 44 or can exist as an independent unit. Alternatively, a portion of the provider detection electronics 36 can be incorporated into the SLIC 44. For instance, the electronics activation mechanism 53 can be incorporated into the SLIC 44, i.e., a switch which is activated by the interface controller 50 can be included on the SLIC 44. The SLIC 44 and the provider detection circuit combination should be replicated for each premises communication system 22 to which the remote unit 18 provides services.

Figure 4:
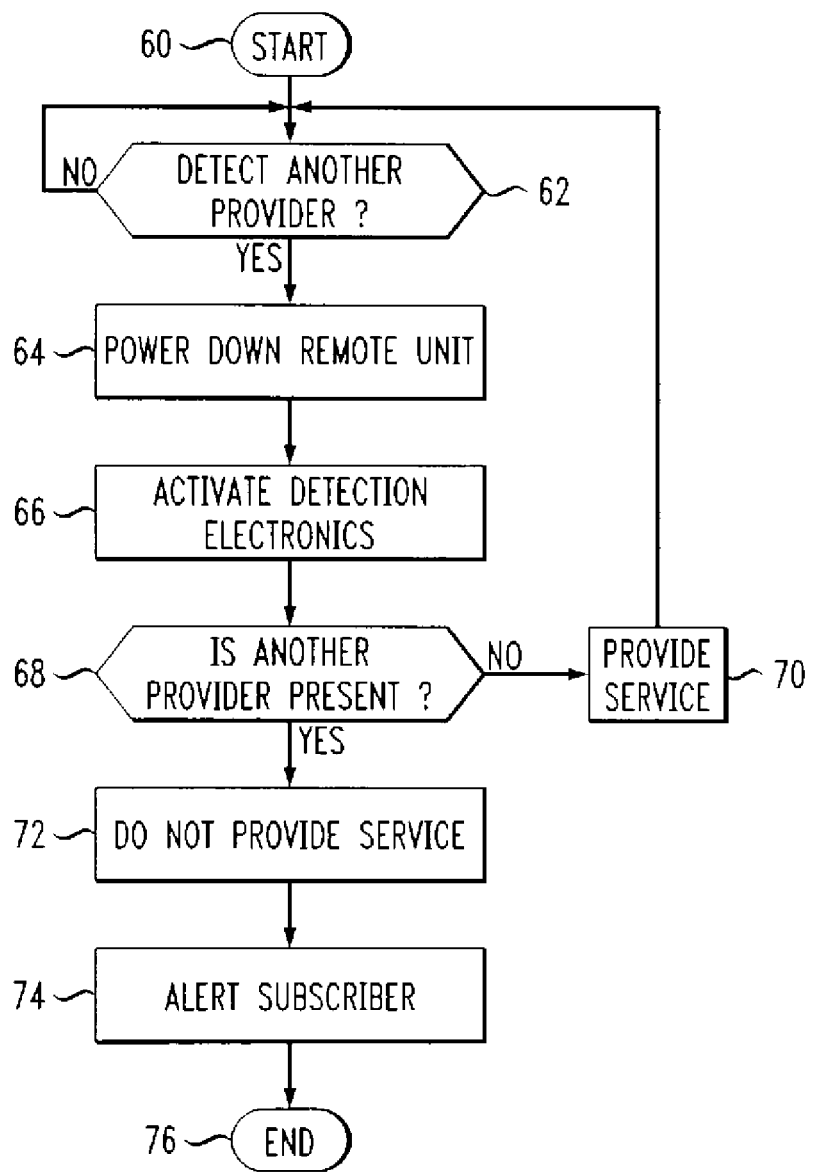
FIG. 4 is a flow diagram illustrating a method of operating a remote unit.

FIG. 4 is a flow diagram illustrating a method for operating the remote unit 18 or an equivalent unit. The process begins at step 60 when the remote unit 18 is powered up. At decision 62, a determination is made whether it is time to inquire whether another service provider 32 is present. As described above, this inquiry can be performed when the remote unit 18 is powered up and/or when the premises communication system 22 is used. Additionally, the inquiries can be performed indefinitely or can be performed a pre-determined number of times and then stopped until the remote unit 18 is powered up again. The process remains at decision block 62 until it is time to make an inquiry.

When it is time to make an inquiry, any potential placed on the premises communication system 22 by the remote unit 18 is removed from the premises communication system 22 at step 64. The interface controller 50 can remove this potential by placing the SLIC 44 in a power-down mode. At step 66, the provider detection electronics 36 are activated. These electronics can be activated by closing a switch in the provider detection electronics 36. At decision 68, a determination is made whether there is cross-connection with another provider on the premises communication system 22. This determination can be made by monitoring the output of the provider indicator 54. As described above, a suitable provider indicator 54 is an optocoupler and when the optocoupler outputs a logic low, the cross-connection condition exists and the positive exit is taken from decision 68. When the optocoupler outputs a logic high, there is no cross-connection with another service provider 32 and the negative exit is taken.

When the negative exit is taken from decision 68, the interface controller 50 returns the SLIC 44 to a powered up mode and the remote unit 18 provides services to the subscriber as illustrated at process block 70. When the positive exit is taken from decision 68, the interface controller 50 leaves the SLIC 44 in the powered down mode and the services are provided by the other service provider 32 as illustrated at process step 72. At step 74, the subscriber is alerted to the activity of the other service provider 32. In order to alert the subscriber, the controller 50 can activate the subscriber notification mechanism 38. The process ends at end step 76.

The fixed wireless loop network described above is for illustrative purposes only as the remote unit 18 can be employed with networks other than fixed wireless loop networks. Other networks can employ a variety of communication links in order to achieve communication between the network and a remote unit. Examples of communication links include, but are not limited to, wire communication links such as twisted pair links and coaxial cable links, fiber optic links and links employing other signal-carrying media. The network interface 28 can be easily adapted to provide communication between these networks and the premises communication system.

The provider detection electronics 36 can be included in remote units of any network associated with cross-connection difficulties. For instance, set top boxes used to provide cable television services is an example of a remote unit 18 which can be associated with cross-connection difficulties. These set top boxes can be adapted to provide telephone service and/or high-speed data service in addition to television service. In order for the premises communication system to receive the telephone service, the set top box is connected to the premises communication system. However, if the set top box is connected without disconnecting or disabling the network which previously provided the telephone service to the premises communications system, a cross-connection will exist.

The provider detection electronics 36 can be included in the remote units of a cable service network to prevent the difficulties associated with these cross-connections. The provider detection electronics 36 are preferably connected with the wires associated with the tip and ring lines of the premises communication system. The provider detection electronics can be in communication with a controller which operates in accordance with the flow diagram illustrated in FIG. 4. Accordingly, the remote unit/set top box of the cable service will withhold the telephone services when a cross-connection is detected and will provide the telephone services when the cross-connection is not detected.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A remote unit for use in conjunction with a network, comprising:
a network interface configured to provide an interface between a premises communication system and a first network, the first network being configured to provide at least one service to the premises communication system; and
a detector configured to detect a cross-connection to a second network, the second network being separately coupled to the premises communication system by a network interface device separate from the remote unit, the second network being configured to provide the service to the premises communication system.

2. The remote unit of claim 1, wherein the network interface is configured to withhold the service from the premises communication system in response to the detection of the cross-connection.

3. The remote unit of claim 1, wherein the network interface is configured to provide the service to the premises communication system when the cross-connection is not detected.

4. The remote unit of claim 1, wherein the detector is configured to detect the presence of a current on the premises communication system, the current being caused by the cross-connection to the second network.

5. The remote unit of claim 1, wherein the premises communication system includes a tip line and a ring line and the detector is coupled to the tip line and the ring line.

6. The remote unit of claim 1, wherein the detector includes an electronics activation mechanism in series with a current presence indicator.

7. The remote unit of claim 6, wherein the electronics activation mechanism is a switch and the current presence indicator is an optocoupler.

8. The remote unit of claim 1, wherein the remote unit is configured to notify a subscriber that the cross-connection is detected.

9. The remote unit of claim 1, wherein the remote unit is a set top box.

10. The remote unit of claim 1, wherein the network interface is adapted to communicate with a base station included in the first network.

11. The remote unit of claim 10, wherein the network interface is adapted to communicate with the base station over a wireless link between the network interface and the base station.

12. The remote unit of claim 1, wherein the remote unit is adapted to receive a plurality of services over the first network.

13. The remote unit of claim 12, wherein one of the plurality of services is television service and another of the plurality of services is telephone service.

14. The remote unit of claim 1, wherein the first network corresponds to a first service provider and the second network corresponds to a second service provider.

15. The remote unit of claim 1, wherein the remote unit and the second network interface are located at premises associated with the premises communication system.

16. A method of operating a network, comprising:
providing an interface between a first network and a premises communication system such that the premises communication system can receive at least one service over the first network; and
detecting a cross-connection to a second network separately coupled to the premises communication system by a network interface device separate from a remote unit including the interface, the second network being configured to provide the service to the premises communication system.

17. The method of claim 16, further comprising:
providing services to the premises communication system when the cross-connection is not detected.

18. The method of claim 16, further comprising:
withholding services from the premises communication system when the cross-connection is detected.

19. The method of claim 16, wherein detecting a cross-connection includes detecting the presence of a potential on the premises communication system.

20. The method of claim 16, wherein detecting a cross-connection is performed when a subscriber operates an item of subscriber premises equipment in communication with the premises communication system.

21. The method of claim 16, further comprising:
notifying a subscriber that the cross-connection is detected.

22. The method of claim 16, wherein the first network corresponds to a first service provider and the second network corresponds to a second service provider.

23. A network comprising:
a first network base station configured to provide services from a first provider to a premises communication system; and
a remote unit configured to provide an interface between the base station and the premises communication system, the remote unit including a detector for detecting a cross-connection to a second network, the second network being configured to separately provide the services to the premises communication system by a network interface device separate from the remote unit.

24. The network of claim 23, wherein the remote unit is configured to withhold the services from the premises communication system when the cross-connection is detected.

25. The network of claim 23, wherein the remote unit is configured to provide the service to the premises communication system when the cross-connection is not detected.

26. The network of claim 23, wherein the detector detects the presence of a current on the premises communication system, the current being caused by the second network.

27. The network of claim 23, wherein the network interface includes a subscriber line interface circuit connected in parallel with the detector.

28. The network of claim 23, wherein the remote unit includes a subscriber notification mechanism for notifying a subscriber when the cross-connection is detected.

29. The network of claim 23, wherein the second network corresponds to a second provider to the premises communication system.

30. The network of claim 23, wherein the detector includes an electronics activation mechanism in series with a current presence indicator.

* * * * *